United States Patent [19]

Kinoshita et al.

[11] Patent Number: 4,545,238

[45] Date of Patent: Oct. 8, 1985

[54] MICROWAVE AND LUMINOUS PROBE

[76] Inventors: Masao Kinoshita, 41-3, Aza Yokomichi, Oaza Nagakute, Nagakute-cho, Aichi-gun, Aichi-ken; Teruo Yamanaka, 1756-2, Aza Hosoguchishita Oaza Hirabari, Tempaku-cho, Tempaku-ku, Nagoya-shi, Aichi-ken; Kizo Hayakawa, 41-2, Higashiyashiki, Takayokosukamachi, Tokai-shi, Aich; Takao Sugimoto, 148, Takabata, Nakagawa-ku Nagoya-shi, Aichi-ken, all, Japan

[21] Appl. No.: 563,800

[22] Filed: Dec. 21, 1983

[30] Foreign Application Priority Data

Dec. 23, 1982 [JP] Japan ............................... 57-233048

[51] Int. Cl.[4] ........................................... G01M 15/00
[52] U.S. Cl. ................................. 73/117.3; 73/119 A
[58] Field of Search .................. 73/119 A, 117.3, 116, 73/35

[56] References Cited

U.S. PATENT DOCUMENTS

| 4,337,648 | 7/1982 | Gillespie | 73/119 A X |
| 4,403,504 | 9/1983 | Krage et al. | 73/116 |
| 4,484,469 | 11/1984 | Grover et al. | 73/119 A |

Primary Examiner—Jerry W. Myracle
Attorney, Agent, or Firm—Oblon, Fisher, Spivak, McClelland & Maier

[57] ABSTRACT

A microwave and luminous probe for use in a system for detecting the piston position in an internal combustion engine and the light emitted in a combustion chamber thereof on the basis of a microwave signal and a luminous signal includes a hollow cylindrical case body fitted into the combustion chamber, internal and external conductors coaxially inserted within the case body and having different diameters from each other in the ratio of from 1:1.5 to 1:4, an annular passage defined by an annular space formed between the internal and external conductors and serving as microwave and light transmitting members, and a dipole antenna composed of a metal tube forming the internal conductor protruded from the annular passage in the range of from ⅛ to ⅜ of the wavelength of the microwave. The probe detects the light emitted by combustion in the combustion chamber with high accuracy.

14 Claims, 3 Drawing Figures

F I G. 2
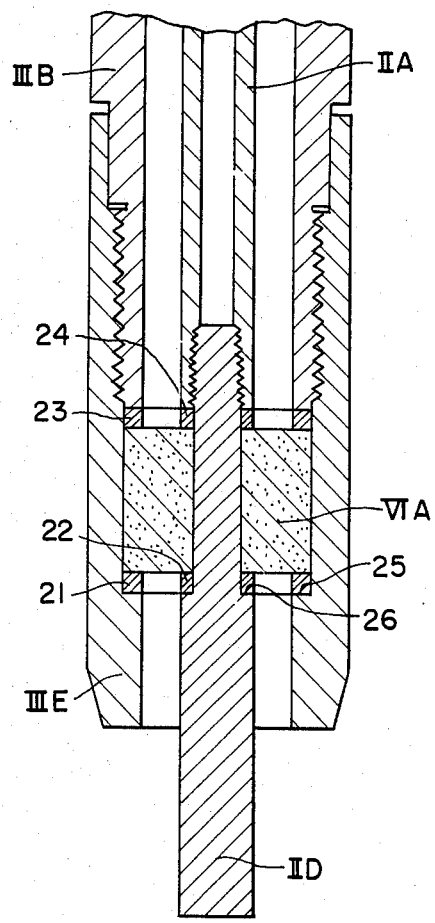
F I G. 3
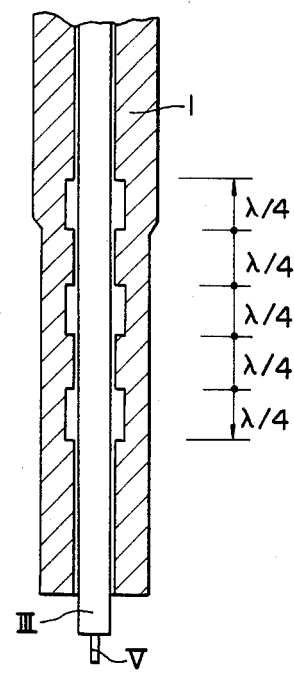

MICROWAVE AND LUMINOUS PROBE

BACKGROUND OF THE INVENTION

1. Field of the Invention

The present invention relates to a microwave and luminous probe to be used in a system for detecting the piston position and the light emitted in a combustion chamber of an internal combustion engine on the basis of a microwave signal and a luminous signal.

2. Description of the Prior Art

Several examples of probes to be used in the above system have been proposed, but problems have been encountered in practical use such as a complicated structure and difficulty in reduction in size due to the large dielectric constant of a dielectric material.

Namely, (1) it has been difficult to give a small diameter to the tip end of a probe, (2) it has also been difficult to machine a dielectric material because the coaxial line (annular passage) is made solid, and (3) an internal conductor must be hollowed to transmit the light therethrough and must have a thickness to enable detection of the light.

SUMMARY OF THE INVENTION

The present invention is an accomplishment of efforts made by the inventors for a long time in order to develop a probe which surely solves problems in practical use of a conventional probe.

It is therefore an object of the present invention to provide a probe having practical merits such as increased accuracy in signal detection, reduced size, a simple structure and easy manipulation.

According to the present invention, a microwave and luminous probe for use in a system for detecting the piston position in an internal combustion engine and the light emitted in a combustion chamber thereof on the basis of a microwave signal and a luminous signal comprises: a hollow cylindrical case body which is fitted into a hole bored through the wall of the internal combustion engine and connected to the combustion chamber; metal tubular internal and external conductors which are coaxially inserted within the case body, the conductors having different diameters from each other in the ratio of from 1:1.5 to 1:4; an annular passage defined by an annular space formed between the internal and external conductors and serving as microwave transmission means and optical transmission means; and a dipole antenna composed of a metal tube forming the internal conductor protruded from the annular passage in the range of from $\frac{1}{8}$ to 3/8 of the wave length of the microwave.

In a microwave and luminous probe of the present invention with such a structure, the microwave propagated through the annular passage is transmitted into the combustion chamber from the dipole antenna and the microwave reflected from the combustion chamber is received by said dipole antenna to detect the light emitted by combustion in the combustion chamber and transmitted through the annnular passage.

The microwave and luminous probe of the present invention has the following advantage. The inner diameter of the external conductor in this probe is uniquely determined by characteristic impedance determined by the dielectric constant of the dielectric in the annular passage and a microwave system for supplying the microwave to the annular passage since the annular passage is defined by the annular space formed between the internal and external conductors. The inner diameter of the external conductor can be made small since the air having the small dielectric constant is used, thus reducing the diameter of the forward end of the probe and enabling selection of the optimum size.

Therefore, in the case of a diesel engine, it is possible to insert the probe into its glow plug hole even as small as about 10 mm in diameter. It is an additional advantage of the probe of the present invention that it does not disturb the flow in the combustion chamber when it is inserted for use therein and it does not disturb the measuring field because it has small thermal capacity and minimizes heat radiation.

The minimum value of the outer diameter of the internal conductor is limited from the viewpoint of machining. The inner diameter of the external conductor is expressed as a function of the square root of the dielectric constant of an insulator of exponential e (air, in the present invention), and since the dielectric constant of air is small, the loss of the microwave generated when it passes through the annular passage can be reduced and the inner diameter can be made small. Therefore, the present invention further provides an advantage that the diameter of the probe on the side of the combustion chamber can be reduced and a degree of freedom of selecting the optimum size can be increased.

Moreover, the probe of the present invention provided a dipole antenna by protruding the internal conductor within the range of from $\frac{1}{8}$ to 3/8 of the wavelength of the microwave used and therefore the microwave can be transmitted and received in the optimum condition. In other words, since the dipole antenna is not protruded excessively, the temperature at the forward end portion of the internal conductor is prevented from being raised abnormally by the heat due to combustion, thus obviating the problem in material strength and damage of the probe when it is inserted or removed. Furthermore, since the antenna is not too short, there is no fear that the microwave may not be transmitted or received.

As described above, the probe of the present invention has advantages that it is small in size, simple in construction and easy in manipulation.

The above and other objects, features and advantages of the present invention will become more apparent from the following description when taken in conjunction with the accompanying drawings in which a preferred embodiment of the invention is shown by way of illustrative example.

BRIEF DESCRIPTION OF THE DRAWINGS

FIG. 2 is a vertical sectional view of the end portion of the probe of this embodiment; and FIG. 3 is a vertical sectional view of a probe mounting section of this embodiment.

DETAILED DESCRIPTION

Figure 1:
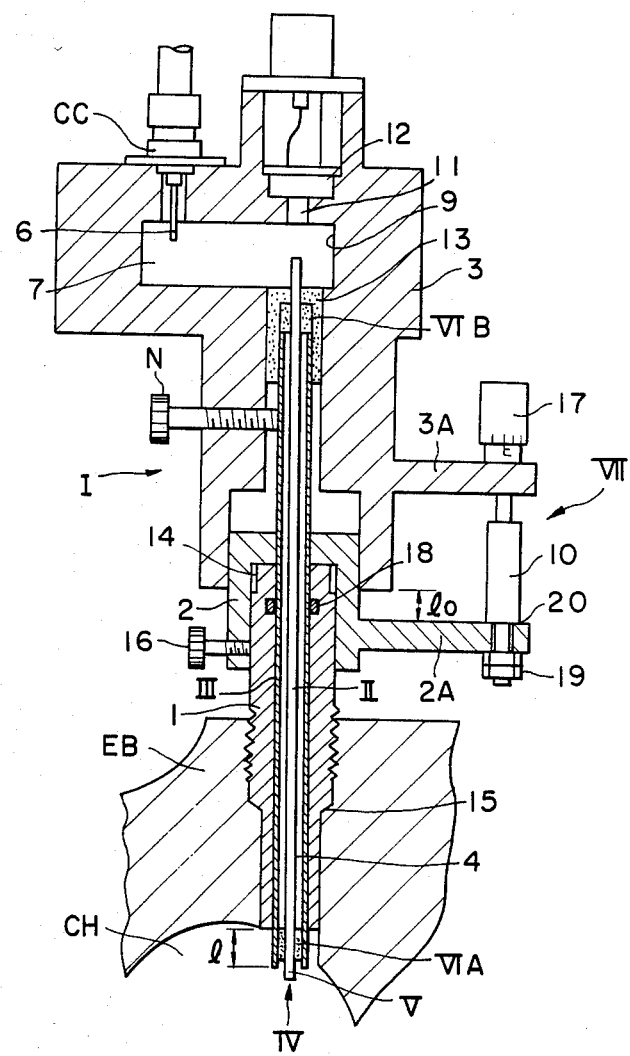
FIG. 1 is a vertical sectional view indicating the entire part of a microwave and luminous probe according to an embodiment of the present invention.

For embodying the microwave and luminous probe of the present invention, the following aspects can be taken.

According to a first aspect of the present invention, the microwave and luminous probe has annular transparent windows of transparent dielectric material at both ends of the annular passage in the axial direction thereof and the length of the transparent window in the axial direction is set to $\lambda/2 \times n$ ($n=1, 2, \ldots$) where $\lambda$ is the wavelength of the microwave within the dielectric material.

The probe of the first aspect of the invention with the aforementioned structure has an advantage that since the light emitted in the combustion chamber is transmitted within the annular passage through transparent windows and the length of the transparent window of dielectric material is set as explained above, the reflection of the microwaves (electromagnetic waves) generated at both ends of the dielectric material is cancelled and thus the transmission efficiency of the microwave is not reduced. If a pair of transparent dielectric materials are provided at both ends of the annular passage, dismatching in impedance of the dielectric material areas to the annular passage defined by the space usually occurs, thereby causing reflection of the electromagnetic wave. In this aspect, however, such reflection is minimized and both internal and external conductors are supported easily.

Moreover, in the first aspect in which the abovementioned structure is employed, it is no longer necessary to machine heat resistant dielectric material (which is usually rather fragile and has poor machinability) for obtaining the length corresponding to a total length of the annular passage, thus improving the machinability and assembling efficiency of the annular passage. Further, as compared with the prior art in which brittle and longer parts have been subjected to machining with great care, this aspect of the invention can reduce both machining time and cost.

Furthermore, the transparent window provided on the side of the combustion chamber prevents entrance of air-fuel mixture, combustion gas and carbon into the probe.

According to a second aspect of the present invention, the transparent window provided in the first aspect at the end portion of the annular passage on the side of the combustion chamber is positioned internally from the end surface of the external conductor at least by a distance corresponding to an inner diameter of the external conductor.

The second aspect of the invention provides an advantage that the transparent window is not directly exposed to flow within the combustion chamber since the transparent dielectric is provided at the inside of the end surface of the external conductor, thereby preventing direct adhesion of fuel and also adhesion of carbon and thus ensuring stable use of the probe for a long period of time.

In the microwave and luminous probe according to a third aspect of the invention, at least one cavity having the length in the axial direction corresponding to $\frac{1}{4}$ of the wavelength of the microwave used is provided at an interval of $\frac{1}{2}$ of the wavelength in the internal wall of the case body abutting the external wall of the external conductor, thereby intensifying the reflection of the microwave and thus preventing the leakage of the microwave from between the external wall of the external conductor and the internal wall of the case body.

In the microwave and luminous probe according to a fourth aspect of the invention, the end portions of both internal and external conductors, which are positioned in the combustion chamber, are split into two members, i.e., tip and base members, and threaded grooves are formed at side circumferential walls of the tip members and threaded grooves are formed at side circumferential walls of the base members, thereby coupling the two members. Further, annular recesses are formed at side outer and inner circumferential walls of the tip members of the internal and external conductors, in which the transparent dielectric is provided. Then, two annular gaskets of large and small diameters are respectively interposed at both ends of the transparent dielectric in such a manner that the annular passage is formed between the large and small gaskets at both ends of the annular transparent dielectric. The aforementioned base members, gaskets, transparent dielectric, gaskets and tip members are tightened integrately with a predetermined force by turning the tip members. The respective materials are so determined that the coefficients of thermal expansion of the tip and base members and the transparent dielectric become almost equal for the sealing purpose.

With such structure, the fourth aspect of the present invention provides advantages that the change of tightening force can be minimized even when the probe is heated by combustion within the combustion chamber; the entrance of gas and carbon is prevented by preventing the formation of a gap; and the transparent dielectric is protected from damage due to an excessive force.

In the microwave and luminous probe according to a fifth aspect of the present invention, a cylindrical case body is composed of two members slidable each other in the axial direction thereof, and the case member on the front end side is fixed to an internal combustion engine and a pair of metal tubes forming the annular passage are fixed to the case member on the rear end side. The positional relationship of the two members in the axial direction is adjusted by an adjustment mechanism, thereby adjusting the length of protrusion of the annular passage into the combustion chamber to assure the optimum coupling between the microwave transmission system and the combustion chamber and thus to provide a sharp resonant signal.

Such a fifth aspect of the present invention has an advantage that even when the specifications of the combustion chamber and others of an internal combustion engine to be measured and the measuring system system are changed, the aforementioned adjustment is made by the adjustment mechanism to provide the optimum coupling and to detect a sharp resonant signal, thereby assuring the high precision measurement.

A microwave and luminous probe according to a preferred embodiment of the invention will be described hereunder with reference to FIGS. 1 to 3.

A microwave and luminous probe according to this embodiment comprises: a cylindrical case body I; an internal conductor II and an external conductor III inserted coaxially into the case body I; an annular passage portion IV formed by the internal conductor II and external conductor III and including an annular passage 4 defined by the annular space between the internal conductor II and the external conductor III; a dipole antenna V formed at the end portion of the annular passage portion IV; transparent windows VI A, VI B provided at both end portions of the annular passage portion IV; and an adjustment mechanism VII.

The case body I is composed of a hollow cylindrical mount portion 1 for mounting a probe to an engine, a guide portion 2 engaged with the mount portion 1 and a main body portion 3 engaged with the guide portion 2.

The mount portion 1 has a small diameter portion at its front end portion and a large diameter portion connected to the small diameter portion through its tapered portion. The outer circumferential wall of the large diameter portion is threaded and is fixed to an engine block EB through engagement with the threaded hole for a glow plug of the engine block EB.

In the annular passage portion IV, in order to set characteristic impedance to 50 ohms, the ratio of the outer diameter of the internal conductor II and the inner diameter of the external conductor III is set to 1:2.3 because the space is formed between the internal conductor II and the external conductor III and it is filled with the air serving as the dielectric. In this embodiment, the outer diameter of the internal conductor is set to 1 mm from the view point of mechanical strength. Therefore, the inner diameter of the external conductor III is set to 2.3 mm. Thus, the outer diameter of the annular passage portion IV can be as small as 4 mm.

For supporting the internal conductor II and allowing the light within the combustion chamber CH to transmit therethrough, the transparent windows or dielectric portions VI A and VI B are respectively provided at both end portions of the annular passage 4. The dielectric portions VI A, VI B are annular transparent materials having an outer diameter of 2.3 mm and having a coaxial internal hole of the same diameter (1 mm) as the outer diameter of the internal conductor II. The internal conductor II is inserted through the internal hole. The length of the dielectric portions VI A and VI B is set to ½ of the wavelength of the microwave within the dielectric portions VI A, VI B which is determined by the dielectric constant. Therefore, the reflected waves are cancelled each other by the wave reflected at both end portions, thus producing the non-reflecting condition.

The annular passage portion IV is formed on the side of the combustion chamber CH with a dipole antenna V by allowing only the internal conductor II to extrude, thereby transmitting and receiving the microwave (electromagnetic wave) within the combustion chamber CH.

The dipole antenna V is 3 mm in length to assure excellent transmission and reception of the microwave and care should be taken to prevent the dipole antenna from being damaged when the annular passage portion IV is inserted into the case body I.

The light emitted by combustion within the combustion chamber CH is transmitted through the transparent dielectric portion VI A, the annular passage 4 defined by the space and the transparent dielectric portion VI B.

For preventing attenuation of the light transmitted due to adhesion of fuel and air-fuel mixture supplied into the combustion chamber CH, combustion gas, and carbon to the dielectric portion VI A, the transparent dielectric portion VI A as an insulator is provided internally from the end surface of the external conductor III of the annular passage portion IV by a distance corresponding to an inner diameter of the external conductor III, thus realizing stable measurement for a long period of time.

An enlarged view of the front end portion of the annular passage portion IV to be inserted into the combustion chamber CH is shown in FIG. 2.

The sealed structure is attained using annular metal gaskets 21, 22, 23, 24 so that the combustion gas and carbon within the combustion chamber CH do not leak into the inside of the annular passage portion IV. Moreover, in order to prevent the leakage from the internal circumference of the dielectric portion VI A, the front end portion of the internal conductor II is split into two members and the internal wall of the one member II A is female-threaded. On the other hand, the small diameter portion of the member II D forming the dipole antenna V is male-threaded. The small gasket 22, the dielectric portion VI A and the small gasket 24 are inserted from the small diameter portion side and the other member II D forming the dipole antenna V is rotated for tightening so that the small gaskets 22, 24 hermetically abut the end surface of the one member II A of the internal conductor II, the surface of the dielectric material II A, and the stepped surface 26 of the other member II D. The abutted surfaces are finished smoothly for securing hermetical sealing. In this case, a tightening torque is determined as 150 g cm in view of the amount of plastic deformation of the small diameter gaskets 22 and 24 and the strength of the screw. A heat resistive ceramic type adhesive is coated on the threaded portions of the one member II A and the other member II D of the internal conductor II for preventing loosening.

Moreover, in order to prevent the leakage from the external circumference of the dielectric portion VI A, the front end portion of the external cnductor III is split into two members and the external circumference of the one member III B is male-threaded. The internal circumference of the other member III E forming the front end portion of the external conductor II is female-threaded, and the spot facing furface 25 is formed to accommodate the large diameter gaskets 21, 23 and the dielectric material VI A. The large diameter gasket 21, the dielectric portion VI A and the large diameter gasket 23 are inserted in this order into the other member III E and the other member III E is screwed for tightening, so that the large gaskets 21 and 23 hermetically abut the end surface of the one member III B of the external conductor III, the end surface of the dielectric material VI A and the spot facing surface 25 of the other member III E. The abutted surfaces are finished smoothly for securing hermetical sealing. The tightening torque is determined as 1.8 kg cm considering plastic deformation of large gaskets 21, 23. A heat resistant ceramic type adhesive is coated to the threaded portions of the one member III B and the other member III E of the external conductor III for preventing loosening.

The external circumferential wall of the other member III E at the end portion thereof is chamfered so that an O-ring 18 is not damaged when the annular passage portion IV is inserted into the mount portion 1.

The end portion of the annular passage portion IV is heated to a maximum temperature of about 600° C. at 700 to 1,000 rpm of the diesel engine at idling.

Therefore, the end portion III E of the external conductor and the end portion II D of the internal conductor are formed of an iron (50%)—nickel (50%) alloy, while the gaskets 21 and 22 are formed of gold with a thickness of 0.3 mm, gaskets 23 and 24 of copper with a thickness of 0.3 mm and the dielectric portion VI A of supphire with a thickness of 2.6 mm, respectively. The materials of the members III E, II D, VI A and those of gaskets 21, 22, 23, 24 and the thickness of gaskets 21, 22, 23, 24 are determined so that any space is not formed between respective materials due to a difference of elongations of members even when the temperature rises up to 600° C.

Namely, the gaskets are composed of a material having malleability for preventing crack of the transparent dielectric material under the tightened conditions and has a high surface smoothness for preventing the leakage of a gas.

Here, the coefficient of thermal expansion and the length of each material are so determined that the length of both gaskets and sapphire and the corresponding length of the end portions III E and II D of external and internal conductors after expansion (when the temperature is changed from room temparature to 600° C.) are made equal or the former is a little longer than the latter.

Therefore, when the temperature is raised up to 600° C. from room temperature, a tightening force always works between the members and even when the temperature is lowered from 600° C. to room temperature, the space is hardly formed between the members.

Even if a heat cycle between room temperature and 600° C. is repeated, the space is hardly formed between the members, thereby preventing the leakage of combustion gas and carbon into the annual passage portion IV even at a high temperature.

The probe is inserted into a glow plug hole of a diesel engine. Namely, a mount portion 1 provided with the thread of the same size as that of the glow plug of the case body I is mounted into the plug hole. In mounting, the mount portion 1 can be secured easily to the engine body by applying the T wrench on the hexagonal part formed at the upper part 14 of the mount portion 1.

The leakage of combustion gas from the external circumferential surface of the mount portion 1 can be prevented by the tapered portion 15, while the leakage of combustion gas from the internal circumferential surface of the mount portion 1 and from the external surface of the annular passage portion IV can also be prevented by the O-ring 18 attached to the annular groove of the mount portion 1.

A probe can be mounted to the engine block EB as follows. The annular passage portion IV is fixed by the screw N to the main body 3. Then, the assembly of the guide portion 2 and the main body 3 is inserted from the upper side in a manner that the annular passage portion IV is inserted into the internal hole of the mount portion 1. Thereafter, the mount portion 1 and the guide portion 2 are fixed by the screw 16.

The tapered surface 15 provided at the engine block CH has a varied height from the combustion chamber CH depending on the type of an engine. When an adjusting mechanism VII is provided for adjusting the insertion length l of the annular pasage portion IV into the combustion chamber CH, such insertion length l can be changed. As a result, the coupling between the microwave transmission path and the combustion chamber CH can be optimized in each engine and thus a sharp resonance can be obtained.

Such adjusting mechanism is very advantageous in case that the shape of the combustion chamber is not certain and the frequency of the microwave supplied is changed. A micrometer head 17 forming the adjustment mechanism VII is fixed to an arm 3A of the main body 3 of the case body. The arm 2A of the guide portion 2 is provided with a hole 20 formed coxially with the micrometer head. A threaded rod 10 is inserted into the hole 20 and is secured to the guide portion 2 with double nuts 19. When the micrometer head 17 which is secured to the main body 3 and allowed only to rotate and the rod 10 which is secured to the guide portion 2 are fixed, the gap $l_0$ between the guide portion 2 and the main body 3 can be changed by rotating the micrometer head 17. Since the annular passage portion IV is secured to the main body 3 by the screw N and the guide portion 2 is secured to the mount portion 1 by the screw 16, the insertion length l of the annular passage portion IV into the combustion chamber CH can be adjusted with an accuracy of 2/100 mm which is an accuracy of the micrometer.

As shown in FIG. 3, the mount portion 1 of the case body I is formed, at an interval of every half wavelength, with a cavity (a recess) having the width equal to ¼ of the wavelength λ of the microwave used. Such cavities serve to prevent the leakage of the electromagnetic wave (emitted from the end portion of the annular passage portion IV) into the space between the external circumferential wall of the annular passage portion IV and the internal circumferential wall of the mount portion 1. Thus, even if the annular passage portion IV is not in direct contact with the mount portion 1, the leakage of the electromagnetic wave can be prevented by means of a plurality of cavities having the width equal to ¼ of the wavelength because the reflection of the electromagnetic wave is enhanced by each cavity.

As shown in FIG. 1, a chamber is formed within the main body 3 and a waveguide converting portion 7 is arranged therein. A center conductor 6 of the coaxial connector CC is arranged on the center axis of a hole bored in the main body 3 with a diameter of 2.3 times that of the center conductor 6. It is protruded by a distance corresponding to ¼ of the wavelength of the frequency supplied into the waveguide converting portion 7 at the position apart from the side wall by ¼ of the wavelength within the waveguide converting portion 7. Thus, a coaxial waveguide converting portion is constructed.

The similar coaxial waveguide converting portion is also formed at the opposing side wall. The internal conductor II of the annular passage portion IV is protruded by a distance corresponding to ¼ of the wavelength of the frequency used at the position apart from the side wall 9 by ¼ of the wavelength within the waveguide converting portion 7. The external conductor III is shorted to a conductor forming the waveguide converting portion 7. The coaxial connector CC is connected to a microwave oscillator (not illustrated) which oscillates a microwave (electromagnetic wave) of the predetermined frequency through the transmission path and the transmission and reception isolator.

In the chamber formed within the main body 3 as shown in FIG. 1, a hole 11 of a diameter larger than that of the annular passage line 4 is formed at the position opposing to the end portion of the protruded annular passage portion IV. In the upper chamber coupled to the hole 11, a photo-electric converter 12 is provided and an electrical signal can be derived through a connector connected to the photo-electric converter 12 by irradiating the light emitted by combustion within the combustion chamber CH to the photo-electric converter 12 through the annular passage line 4.

Since the microwave and luminous probe of this embodiment with the aforementioned structure has the external diameter of the end portion of the annular passage portion IV as small as 4 mm, it can be inserted into a glow plug hole of a diesel engine. The probe of this embodiment has further advantages owing to the reduced size of the end portion of the annular passage portion IV that the loss of the microwave is very small; the flow in the combustion chamber is not disturbed;

and the measuring field is not disturbed due to the small thermal capacity.

Further, since the length of protrusion of the internal conductor II forming the dipole antenna V is set to the optimum range, the probe of this embodiment is advantageous in that the microwave can be transmitted and received effectively and the problems such as the abnormal temperature rise due to the heat by combustion and the material strength as well as the damage when the probe is mounted or removed can all be solved.

The probe of this embodiment provides further advantages that since the transparent dielectric portions VI A, VI B with the predetermined length are provided at both ends of the annular passage portion IV, the reflection of the microwave at both ends of the dielectric is cancelled and the transmission efficiency of the microwave is not lowered and simultaneously since the probe is of a small size, it can be easily machined even if brittle material is used.

The probe of this embodiment provides still further advantages that since the transparent dielectric portion VI A is provided at the inside of the internal conductor II and the external conductor III, contamination of the transparent window due to fuel and carbon can be prevented and stable measurement can be realized for a long period of time.

Further, since the probe of this embodiment is provided with a plurality of cavities of the predetermined width are provided on the mount portion 1 of the case body I, the reflection of the microwave is enhanced, thereby preventing the leakage of the microwave.

It is another advantage of the probe of this embodiment that the leakage of the microwave through the annular passage line 4 can be prevented efficiently because of the structure in which the end portion of the annlar passage portion IV is split into two members and the coefficient of thermal expansion and the size of each member are determined considering its thermally expanded length and because the dielectric materials are hermetically sealed through the gaskets even at the time of measurement.

It is still another advantage of the probe of this embodiment that since the length of protrusion of the annular passage portion IV into the combustion chamber CH can be adjusted by the adjustment mechanism VII, a degree of coupling between the microwave transmission path and the combustion chamber CH to be measured is optimized and a sharp resonant signal can be obtained, thereby increasing the microwave detection accuracy and enabling application of the probe to any type of engine and measuring system.

There are still further advantages in practical use of the probe of this embodiment such that the structure is simple, the operations is easy and the reliability is high.

Although a certain preferred embodiment has been described in detail, it should be understood that the present invention is not limited to the illustrated embodiment, but changes, deletions and additions of components may be made therein as desired without departing from the scope of the spirit of the appended claims.

What is claimed is:

1. A microwave and luminous probe for use in a system for detecting the piston position in an internal combustion engine and the light emitted in a combustion chamber thereof on the basis of a microwave signal and a luminous signal comprising:

a hollow cylindrical case body which is fitted into a hole bored through the wall of the internal combustion engine and connected to the combustion chamber;

metal tubular internal and external conductors which are coaxially inserted within said case body, said internal and external conductors having different diameters from each other in the ratio of from 1:1.5 to 1:4;

an annular passage defined by an annular space formed between said internal and external conductors and serving as microwave transmission means and optical transmission means; and dipole antenna means comrising a metal tube forming said internal conductor protruded from said annular passage in the range of from ⅛ to 3/8 of the wavelength of the microwave, and an annular opening formed at an end of said annular passage;

whereby the microwave propagated through said annular passage is transmitted from said annular opening and said protruded metal tube of said dipole antenna means into said combustion chamber and the microwave reflected from said combustion chamber is received by said protruded metal tube and said annular opening, and the light emitted by combustion in said combustion chamber is received by said annular opening and transmitted through said annular passage.

2. A microwave and luminous probe according to claim 1, further comprising:

annular transparent windows made of transparent dielectric material and provided at both ends of said annular passage in the axial direction thereof, the length of said transparent window in the axial direction being set to $\lambda/2 \times n$, where $n=1,2,\ldots$ and $\lambda$ is the wavelength of the microwave within the dielectric material.

3. A microwave and luminous probe according to claim 2, wherein said annular transparent window, provided at the end of said annular passage on the side of said combustion chamber, is positioned internally from said end surface of said external conductor at least by a distance corresponding to an inner diameter of said external conductor.

4. A microwave and luminous probe according to claim 2, wherein said end portions of both internal and external conductors, which are positioned in said combustion chamber, respectively comprise tip and base members coupled by engaging threaded grooves respectively formed at side circumferential walls of said tip members and threaded grooves respectively formed at side circumferential walls of said base members, annular recesses are formed at side outer and inner circumferential walls of said tip members of said internal and external conductors, said annular transparent window is provided in said annular recesses of said tip members, two annular gaskets of large and small diameters are respectively interposed at both ends of said annular transparent window, in order to form said annular passage between said large and small annular gaskets at both ends thereof, and said tip and base members and said annular transparent window are made of materials having similar coefficients of thermal expansion.

5. A microwave and luminous probe according to claim 4, wherein said hollow cylindrical case body comprises two hollow cylindrical case members slidable each other in the axial direction thereof, said one case member is fixed to said internal combustion engine, said internal and external conductors are fixed to said the other case member, and adjusting means for adjusting the positional relation of said two case members in the axial direction, thereby adjusting the length of protrusion of said annular passage into said combustion chamber.

6. A microwave and luminous probe according to claim 5, wherein said adjusting means comprises a micrometer head fixed to said one and the other case members by connecting means.

7. A microwave and luminous probe according to claim 5, wherein said metal tubular internal and external conductors comprise an internal conductor having the outer diameter of 1 mm, and an external conductor having the inner diameter of 2.3 mm and the outer diameter of 4 mm, thereby setting characteristic impedance to 50 ohms, said annular transparent windows have the axial length of $\frac{1}{2}$ of the wavelength of the microwave therein, said dipole antenna means comprises said internal conductor protruded from said annular passage by the length of 3 mm, said tip members and base members of said internal and external conductors are made of iron (50%)—nickel (50%) alloy, said annular transparent window provided in said annular recesses of said tip members comprises an annular member of a length of 2.6 mm made of sapphire, said lower small and large gaskets comprise annular plates of a thickness of 0.3 mm made of gold, said upper small and large gaskets comprise annular plates of a thickness of 0.3 mm made of copper, three annular cavities are provided at an interval of $\frac{1}{2}$ of the wavelength in said inner wall of said case body, said adjusting means comprises a micrometer head fixed to said one and the other case members by connecting means, said annular transparent window, provided at the end of said annular passage on the side of said combustion chamber, is positioned internally from said end surface of said external conductor at least by a distance corresponding to an inner diameter of said external conductor.

8. A microwave and luminous probe according to claim 4, wherein said tip members and base members of said internal and external conductors are made of iron (50%)—nickel (50%) alloy, said annular transparent window provided in said annular recesses of said tip members comprises an annular member of a length of 2.6 mm made of sapphire, said lower small and large gaskets comprise annular plates of a thickness of 0.3 mm made of gold, said upper small and large gaskets comprise annular plates of a thickness of 0.3 mm made of copper.

9. A microwave and luminous probe according to claim 2, wherein said annular transparent windows have the axial length of $\frac{1}{2}$ of the wavelength of the microwave therein.

10. A microwave and luminous probe according to claim 2, wherein said annular transparent windows are made of sapphire.

11. A microwave and luminous probe according to claim 1, further comprising at least one annular cavity, having the width in the axial direction thereof corresponding to $\frac{1}{4}$ of the wavelength of the microwave used, provided at an interval of $\frac{1}{2}$ of the wavelength in the inner wall of said case body.

12. A microwave and luminous probe according to claim 4, wherein three annular cavities are provided at an interval of $\frac{1}{2}$ of the wavelength in said inner wall of said case body.

13. A microwave and luminous probe according to claim 1, wherein said metal tubular internal and external conductors comprise an internal conductor having the outer diameter of 1 mm, and an external conductor having the inner diameter of 2.3 mm and the outer diameter of 4 mm, thereby setting characteristic impedance to 50 ohms.

14. A microwave and luminous probe according to claim 1, wherein said dipole antenna means comprises said internal conductor protruded from said annular passage by the length of 3 mm.

* * * * *